United States Patent
Frenkel

(10) Patent No.: US 7,059,578 B2
(45) Date of Patent: Jun. 13, 2006

(54) DIAPHRAGM AND HYDRAULICALLY-OPERATED VALVE USING SAME

(75) Inventor: Boris Frenkel, Netanya (IL)

(73) Assignee: Raphael Valves Industry (1975) Ltd., Or Akiva (IL)

( * ) Notice: Subject to any disclaimer, the term of this patent is extended or adjusted under 35 U.S.C. 154(b) by 0 days.

(21) Appl. No.: 10/884,001

(22) Filed: Jul. 6, 2004

(65) Prior Publication Data

US 2005/0205815 A1 Sep. 22, 2005

(30) Foreign Application Priority Data

Jul. 6, 2003 (IL) .................................... 156797

(51) Int. Cl.
F16K 31/145 (2006.01)
F16K 31/165 (2006.01)
F16K 31/365 (2006.01)
F16K 31/385 (2006.01)

(52) U.S. Cl. .................. 251/61.4; 251/61.1; 92/34; 92/130 B

(58) Field of Classification Search ........... 251/61.1, 251/61.2, 61.4, 331; 92/94, 98 R, 103 F, 92/130 B
See application file for complete search history.

(56) References Cited

U.S. PATENT DOCUMENTS

| 4,619,436 A | * | 10/1986 | Bonzer et al. ............. 251/61.1 |
| 5,108,067 A | * | 4/1992 | Straub ........................ 251/45 |
| 6,095,484 A | * | 8/2000 | Frenkel ...................... 251/61.1 |

* cited by examiner

Primary Examiner—Edward K. Look
Assistant Examiner—John K. Fristoe, Jr.
(74) Attorney, Agent, or Firm—Pearl Cohen Zedek Latzer, LLP

(57) ABSTRACT

The present invention relates to fluid control valves. The invention provides an improved diaphragm useful for a large hydraulically-operated valve or pressure regulating valve of the type used in pipelines to transport water, oil, gas, acids, alkalis and other fluids.

The diaphragm being provided with an upper face arranged to be exposed to a control hydraulic pressure and a lower face arranged to selectively seal and open a passage between a valve inlet and a valve outlet, ribs on said upper face urging the diaphragm towards a sealing position. The diaphragm being characterized by the addition of an elastomer ring element disposed adjacent to the upper face and adjacent to the largest diameter of the diaphragm exposed inside a valve to which it may be assembled, an upper face of the flexible ring element being in pressure contact with a portion of the rigid body of the valve. The flexible ring element further urging the diaphragm towards its lower position and allowing closure of the valve without use of a metallic compression spring.

7 Claims, 3 Drawing Sheets

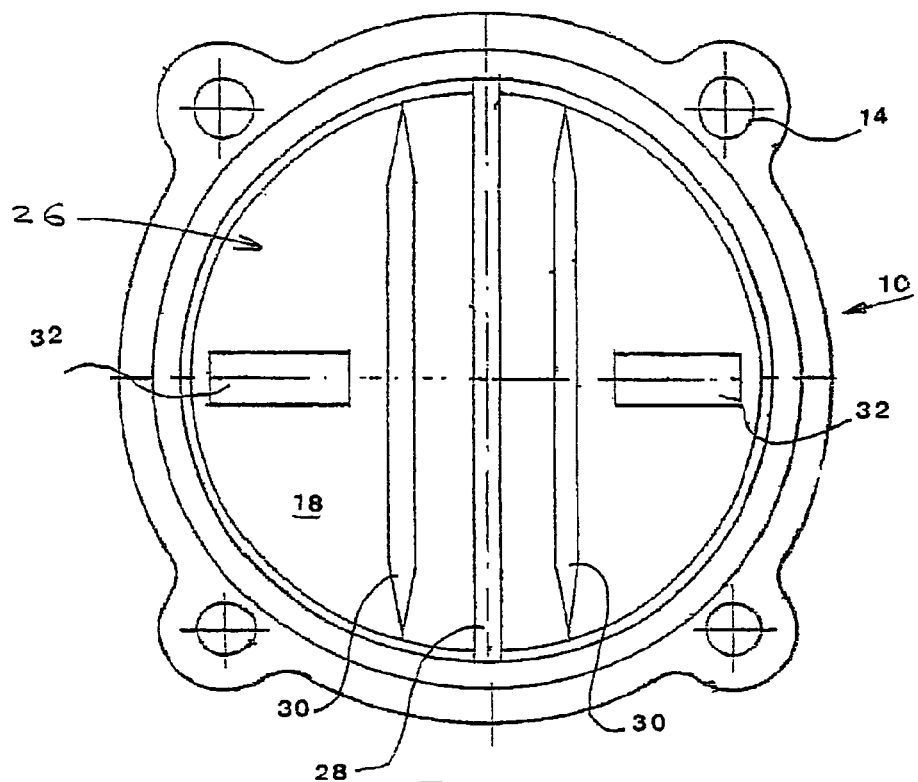
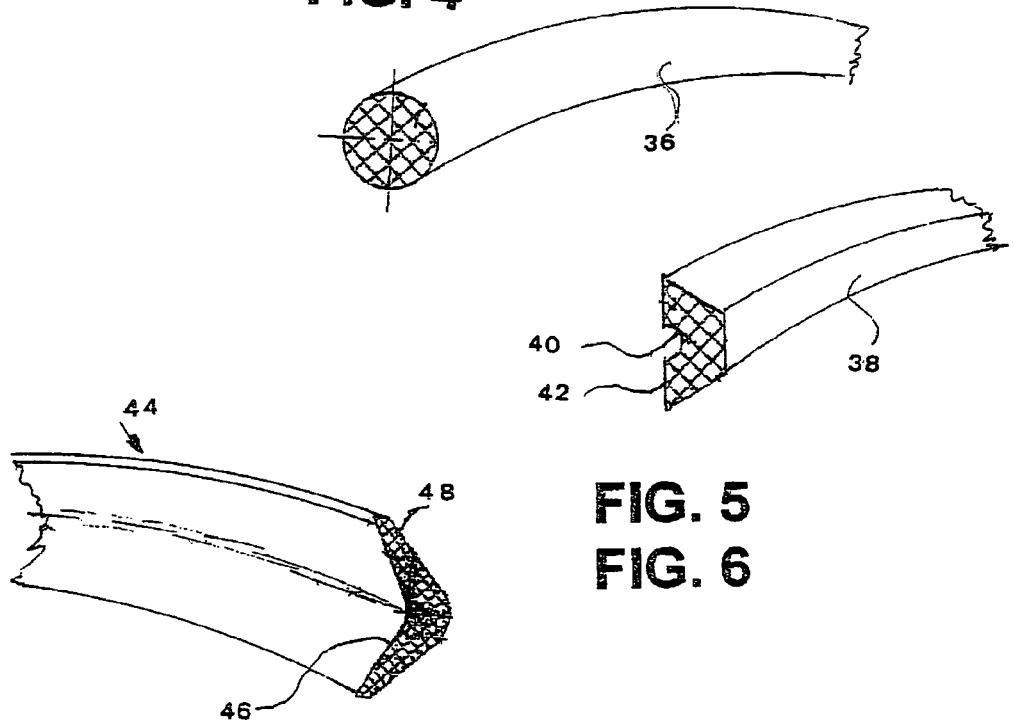
FIG. 3
FIG. 4
FIG. 5
FIG. 6

DIAPHRAGM AND HYDRAULICALLY-OPERATED VALVE USING SAME

CROSS-REFERENCE

This application claims priority of Israel Patent Applications, 156797, filed Jul. 6, 2003.

BACKGROUND OF THE INVENTION

The present invention relates to fluid control valves.

More particularly, the invention provides an improved diaphragm useful for a large hydraulically-operated valve or pressure regulating valve of the type used in pipelines to transport water, oil, gas, acids, alkalis and other fluids.

Although valves can be installed and operated in any position, in the present specification the term lower refers to the side of the diaphragm always in contact with the fluid being transported. Upper refers to the opposite side of the diaphragm which may be in contact with a fluid to control opening/closing of the valve.

Small fluid control valves are easily actuated by hand, foot, machine, solenoid or pilot air. Large valves, about 8" or more, are more difficult to operate, particularly when the fluid being transported is at high pressure, because the forces needed to prevent flow increase as the square of the pipeline diameter. A well known solution to the problem is to use the fluid being transported as an actuator, to form a hydraulically-operated diaphragm valve. A diaphragm valve has the advantage of not requiring a stuffing box, and operating leak-free for the life of the diaphragm.

Typically the diaphragm valve is operated by directing hydraulic pressure into/out of a chamber on the upper side of the diaphragm. In some designs a steel compression spring is used in the upper chamber to ensure closure of the valve when needed. When the valve is to be opened, pressure in the upper chamber is reduced and the fluid being handled pushes open the diaphragm for the resumption of flow.

Clearly it is highly desirable that the valve diaphragm operates for the largest possible number of cycles and the longest possible time period. The cost of a failed diaphragm goes far beyond the cost of a replacement, as leakage needs to be controlled, a technician needs to be sent to the site and the pipeline may need to be shut down during replacement of the failed component.

Hydraulically-operated diaphragm valves are known and in use.

Newberg discloses a diaphragm valve in International Publication WO 02/066876 A1. The valve is operated by manually turning a control cylinder which operates a screw mechanism to raise or lower a sealing element extending from a diaphragm. Valves of this type are appropriate only for small diameter conduits, as the valve is hand, not hydraulically operated.

Some designs, for example the Elastomeric Element Valve disclosed by Walton et al. in U.S. Pat. No. 6,102,071, employ a metal coil compression spring to assist in valve closure. Such spring was considered necessary in a hydraulically-operated valve because when both the upper chamber and the passages leading to/from the pipeline are at the same pressure, there is no substantial force available to close (lower) the diaphragm. The problem with this design is that at small pressure differences and low flow rates the metallic spring causes vibrations which quickly damage the diaphragm, thus making the valve inoperable. A further drawback of the design is the pressure drop caused by the spring in the pipeline during normal open-valve operation. Yet a further problem is that after such valve has been left open for an extended period, the valve is very difficult to close, due to loss of elasticity in the elastomer at the sharp bend proximate to the maximum operating diameter of the diaphragm.

In response to these difficulties the present inventor developed a new design first disclosed 30 Apr. 1993 in Israel Patent No. 119,963. The distinctive feature of this design is the presence above its concave surface of radial and circular ribs urging the diaphragm into its closed (lower) position without requiring a steel coil compression spring for this purpose. This design proved to be effective for smaller valves, in the range ½" to 8" (13–203 mm). However valves larger than 8" required ribs on the concave surface which were wide and high. Furthermore the strong closing force generated by these ribs produced an unacceptable pressure loss in the pipeline wherein the valve was installed.

The difficulties experienced with the diaphragm described in Israel Patent No. 119,963 were overcome by the Spring Diaphragm for Shut-Off Valves and Regulators disclosed by the present inventor in U.S. Pat. No. 6,095,484. A two-part diaphragm has an upper and a spaced-apart lower tier. The lower tier functions as a conventional diaphragm. The upper tier forms a resilient disk urging the lower part towards its closed (lower) position. Both parts are provided with ribs. This design was tested and found to meet all operational and reliability requirements. However, manufacturing cost was too high in view of the sharp competition existing in the field of hydraulic valves.

OBJECTS OF THE INVENTION

It is therefore one of the objects of the present invention to obviate the disadvantages of prior art diaphragms and to provide a hydraulically-operated diaphragm valve which has a long operating life and can be closed reliably even when the valve has been left open for an extended period.

It is a further object of the present invention to provide a valve diaphragm which can be manufactured at a moderate cost.

In particular it is an object of the present invention to provide a diaphragm which can be operated when fitted into a hydraulically operated valve without the use of a metallic spring.

Yet a further object of the invention is to provide a diaphragm suitable for use in 8" and larger valves.

SUMMARY OF THE INVENTION

The present invention achieves the above objects by providing an elastomer diaphragm for use in a hydraulically-operated valve and in a hydraulic pressure regulator, said diaphragm being provided with an upper face arranged to be exposed to a control hydraulic pressure and a lower face arranged to selectively seal and open a passage between a valve inlet and a valve outlet, ribs on said upper face urging said diaphragm towards a sealing position, said diaphragm being characterized by the addition of an elastomer ring element disposed adjacent to said upper face and adjacent to the largest diameter of the diaphragm exposed inside a valve to which it may be assembled, an upper face of said flexible ring element being in pressure contact with a portion of the rigid body of said valve, said flexible ring element further urging said diaphragm towards its lower position and allowing closure of said valve without use of a metallic compression spring.

In a preferred embodiment of the present invention there is provided an elastomer diaphragm, wherein said flexible ring element and said diaphragm are separate components.

In a most preferred embodiment of the present invention there is provided a 200 mm or larger hydraulically-operated valve fitted with a diaphragm as described.

It will thus be realized that the novel diaphragm of the present invention serves to allow valve closure by means of the flexible ring in combination with the ribs molded on the upper face of the diaphragm. The dimensions and number of ribs are determined by the diameter of the attached pipeline.

Several features of previously-developed improvements, such as rib formation and a textile center reinforcing element, are also retained in the diaphragm of the present invention. However the addition of an elastomer ring element disposed adjacent to and pressing on the upper face of the diaphragm is the innovation central to the present invention. It has been found that the downward pressure applied adjacent to the largest free diameter is most helpful for closing the valve yet does not substantially increase force needed to open the sealed passage for fluid flow. A likely explanation for this surprising situation is that movement for the closure (downward) action starts at the outer section of the diaphragm, with assistance from the ring element, whereas the opening of the diaphragm proceeds first from the center and moves only later towards the outer diameter.

Costs can be reduced by use of a commercially-available 'O' ring or shaft seal to serve as an elastomer ring element. Such rings and seals are available as standard items in diameters of up to 1 meter or more from manufacturers such as Martin Merkel, Hamburg, and others.

While the 2-way valves shown in the figures are used in larger quantities than pressure regulators, not shown, which have many similarities to valves, the operational requirements of the pressure regulators are more severe due to more frequent operation. The importance of a long-life diaphragm for regulators is therefore of great importance.

SHORT DESCRIPTION OF THE DRAWINGS

The invention will now be described further with reference to the accompanying drawings, which represent by example preferred embodiments of the invention. Structural details are shown only as far as necessary for a fundamental understanding thereof. The described examples, together with the drawings, will make apparent to those skilled in the art how further forms of the invention may be realized.

In the drawings:

FIG. 3 is a plan view of the same diaphragm turned downside up;

FIG. 4 is a sectional view of a first embodiment of the flexible ring element;

FIG. 5 is a sectional view of a second embodiment of the flexible ring element;

FIG. 6 is a sectional view of a third embodiment of the flexible ring element;

FULL DESCRIPTION OF THE INVENTION

Figure 1:
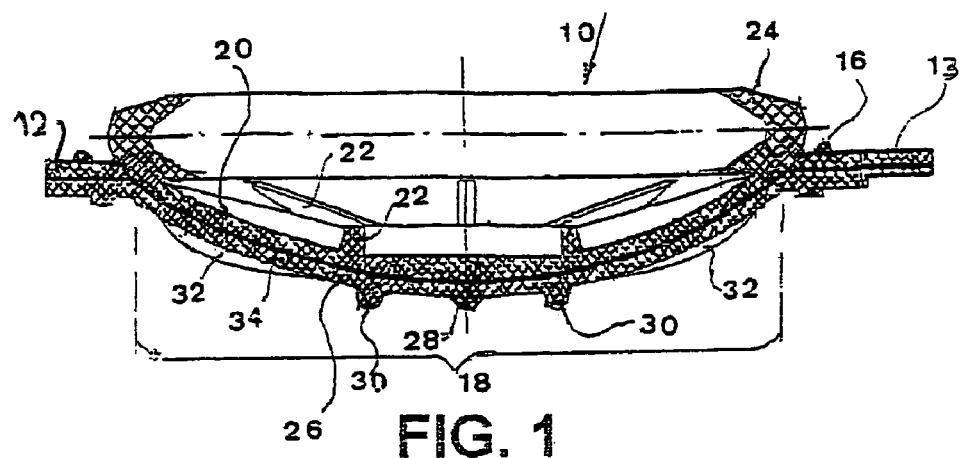
FIG. 1 is a cross-sectional elevational view of a preferred embodiment of the diaphragm according to the invention.
Figure 2:
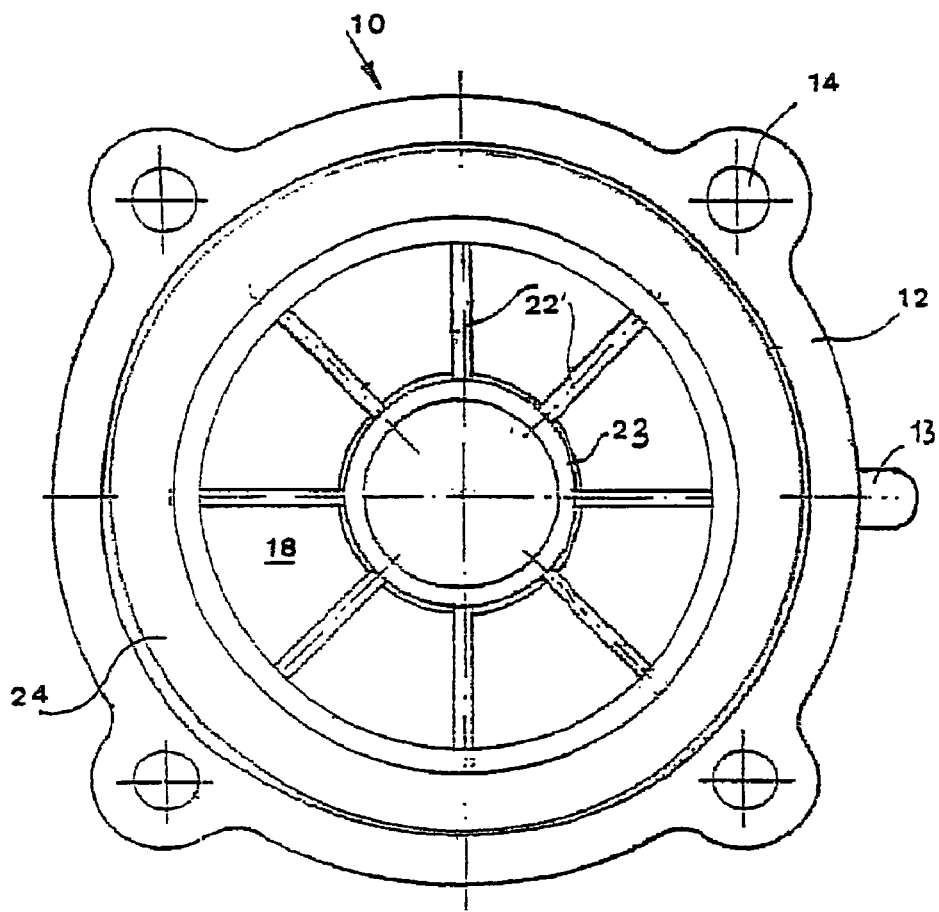
FIG. 2 is a plan view of the same.

There is seen in FIGS. 1, 2 and 3 an elastomer diaphragm 10 for use in a hydraulically-operated valve (seen in FIG. 7) and in a hydraulic pressure regulator (not shown).

The material to be used for manufacturing the diaphragm is dependent on the type of fluid being carried and on the temperature range to which the diaphragm is to be exposed. Typical suitable materials are Nitrile butadiene rubber and Neoprene.

The diaphragm 10 has an outer, substantially flat area 12 allowing clamping by the valve (seen in FIG. 2) an orientation tab 13 and multiple apertures 14 for passage of fasteners (not seen). Area 12 is provided with sealing beads 16, as known in the prior art. (U.S. Pat. No. 2,302,930 to Anderson).

The central portion 18 of the diaphragm 10 is bulged to avoid excessive stretching of the diaphragm material when in use, and to enhance stability in both upper and lower positions.

An upper face 20 is arranged to be exposed to a control hydraulic pressure. Tangential ribs 22 and radial ribs 23 on the upper face 20 urge the diaphragm 10 downwards towards a lower sealing position, seen in FIG. 7. Additionally the diaphragm comprises an elastomer ring element 24 disposed adjacent to the upper face 20 and adjacent to the largest diameter of the diaphragm exposed inside a valve to which it may be assembled. When assembled an upper face of the flexible ring element 24 is in pressure contact with a portion of the rigid body of the valve. Thus the flexible ring element 24 assists in urging the diaphragm towards its lower position and allowing closure of the valve, as seen in FIG. 8.

In the present embodiment the flexible ring element 24 is produced as part of an integral diaphragm molding.

Figure 7:
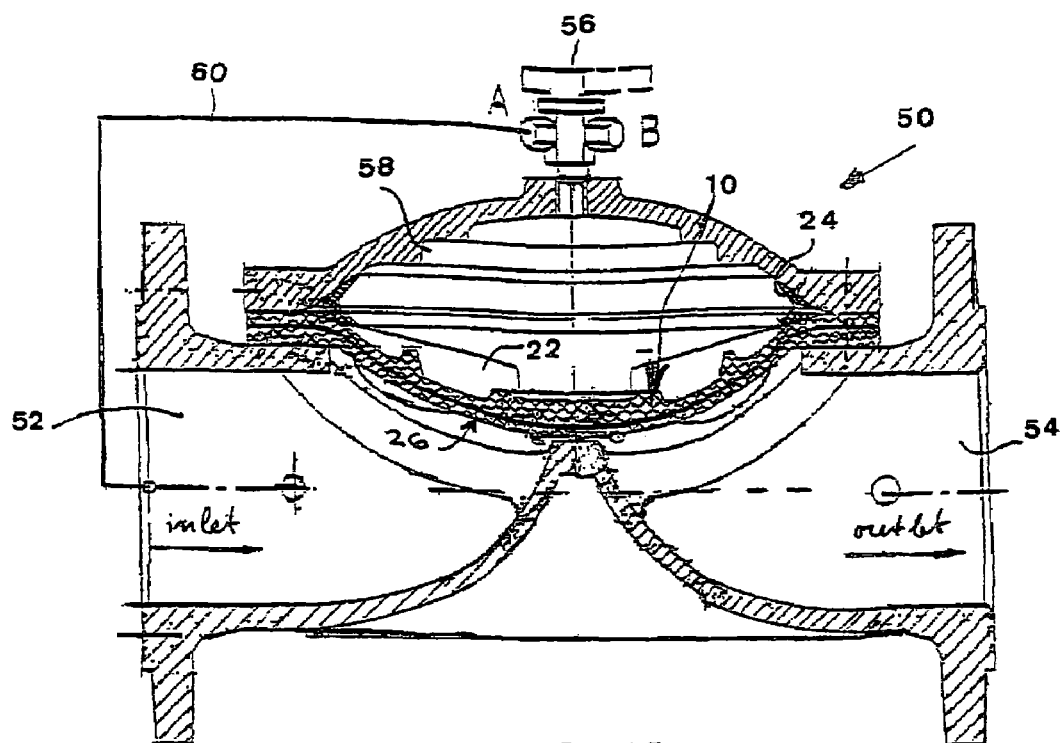
FIG. 7 is a sectional elevational view of a closed 2-way hydraulically-operated valve using the diaphragm according to the invention.
Figure 8:
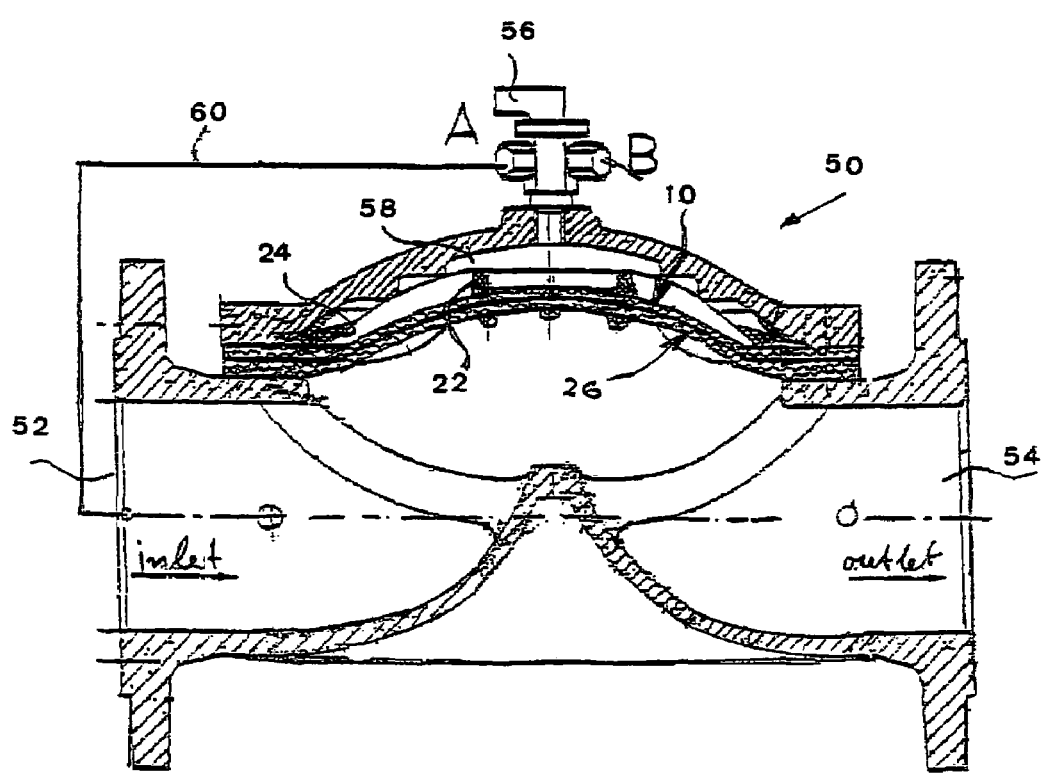
FIG. 8 is a sectional elevational view of the same valve shown in its open position.

The lower face 26 of the diaphragm 10 is arranged to selectively seal and open a passage between a valve inlet and a valve outlet, when assembled as in FIG. 7. A central projection 28 on the lower face 26 is used for sealing. Two further projecting ridges 30, parallel to the center line, reduce vibration and thus act as noise suppressers. A pair of support pads 32 are shown which contact a rib of the valve casing when in the lower sealing position, as seen in FIG. 7. In practice only of the two ridges 30 or pads 32 are active while the second being passive depending on the direction of flow.

A reinforcing central layer 34 is molded in between the upper 20 and lower face 26. The layer 34 is freely flexible, but resistant to tensile forces. Suitable materials for layer 34 include cotton and nylon.

With reference to the rest of the figures, similar reference numerals have been used to identify similar parts.

Seen in FIG. 4 is a flexible ring element 36 which has a circular cross-section. The flexible ring element 36 and the remainder of the diaphragm are separate components. This simplifies the molding die required for production of the diaphragm and also opens the possibility of selecting a material for the ring different from the material used for the main body of the diaphragm.

A further advantage of this design is the wide availability of 'O' rings and the moderate cost thereof.

Referring now to FIG. 5, there is depicted a flexible ring element 38 which has a trapezoidal cross-section. A small relief area 40 at the midpoint of the longest side 42 extends the compression range of the ring element 38.

FIG. 6 shows a flexible ring element 44 which has a V-shaped cross-section 46. This form has a long pressure range. The tapered wings 48 of the V prevent stress-concentration damage to the diaphragm when pressed thereagainst.

FIGS. 7 and 8 illustrate a hydraulically-operated valve 50 fitted with a diaphragm 10.

Inlet port 52 and outlet port 54 diameter exceeds 8" (or may be less). The diaphragm, as described with reference to FIG. 1, is operated without use of a metallic compression spring. The valve is shown in the closed position in FIG. 7 and in the open position in FIG. 8.

A three-way valve 56 is in fluid communication with the upper chamber 58. A tube 60, seen in FIG. 8, connects the inlet port 52 to port A of the three-way valve 56, so that the hydraulically-operated valve 50 closes because hydraulic pressure is equalized on both faces of the diaphragm 10, and the flexible ring element 24 together with the ribs 22 urge the diaphragm 10 downwards.

To reopen the valve 50 hydraulic pressure in the upper chamber 58 is reduced by releasing the liquid contents thereof through port B.

If the fluid being handled is water, and the occasional spillage of a small quantity of fluid is acceptable, there is no need to connect the three-way valve 56 to the outlet port 54, as the upper chamber 58 can be voided to the ground through port B of the three-way valve 56, as seen in FIG. 7.

The scope of the described invention is intended to include all embodiments coming within the meaning of the following claims. The foregoing examples illustrate useful forms of the invention, but are not to be considered as limiting its scope, as those skilled in the art will readily be aware that additional variants and modifications of the invention can be formulated without departing from the meaning of the following claims.

I claim:

1. An elastomer diaphragm for use in a hydraulically-operated valve, said diaphragm being provided with an upper face arranged to be exposed to a control hydraulic pressure and a lower face arranged to seal and open a passage between a valve inlet and a valve outlet, ribs on said upper face urging said diaphragm towards a sealing position, said diaphragm being characterized by the addition of an elastomer ring element disposed adjacent to said upper face and adjacent to the largest diameter of the diaphragm exposed inside a valve to which it may be assembled, an upper face of said flexible ring element being in pressure contact with a portion of the rigid body of said valve, said elastomer ring element further urging said diaphragm towards its lower position and allowing closure of said valve without use of a metallic compression spring, wherein said urging of said diaphragm towards its lower position by said elastomer ring is enabled also when the hydraulic pressure above and below said diaphragm are equal.

2. The elastomer diaphragm as claimed in claim 1, wherein said elastomer ring element has a circular cross-section.

3. An elastomer diaphragm for use in a hydraulically-operated valve, said diaphragm being provided with an upper face arranged to be exposed to a control hydraulic pressure and a lower face arranged to seal and open a passage between a valve inlet and a valve outlet, ribs on said upper face urging said diaphragm towards a sealing position, said diaphragm being characterized by the addition of an elastomer ring element disposed adjacent to said upper face and adjacent to the largest diameter of the diaphragm exposed inside a valve to which it may be assembled, an upper face of said flexible ring element being in pressure contact with a portion of the rigid body of said valve, said elastomer ring element further urging said diaphragm towards its lower position and allowing closure of said valve without use of a metallic compression spring, wherein said urging of said diaphragm towards its lower position by said elastomer ring is enabled also when the hydraulic pressure above and below said diaphragm are equal, and wherein said elastomer ring element has a trapezoidal cross-section.

4. An elastomer diaphragm for use in a hydraulically-operated valve, said diaphragm being provided with an upper face arranged to be exposed to a control hydraulic pressure and a lower face arranged to seal and open a passage between a valve inlet and a valve outlet, ribs on said upper face urging said diaphragm towards a sealing position, said diaphragm being characterized by the addition of an elastomer ring element disposed adjacent to said upper face and adjacent to the largest diameter of the diaphragm exposed inside a valve to which it may be assembled, an upper face of said flexible ring element being in pressure contact with a portion of the rigid body of said valve, said elastomer ring element further urging said diaphragm towards its lower position and allowing closure of said valve without use of a metallic compression spring, wherein said urging of said diaphragm towards its lower position by said elastomer ring is enabled also when the hydraulic pressure above and below said diaphragm are equal, and wherein said elastomer ring element has a V-shaped cross-section.

5. An elastomer diaphragm for use in a hydraulically-operated valve, said diaphragm being provided with an upper face arranged to be exposed to a control hydraulic pressure and a lower face arranged to seal and open a passage between a valve inlet and a valve outlet, ribs on said upper face urging said diaphragm towards a sealing position, said diaphragm being characterized by the addition of an elastomer ring element disposed adjacent to said upper face and adjacent to the largest diameter of the diaphragm exposed inside a valve to which it may be assembled, an upper face of said flexible ring element being in pressure contact with a portion of the rigid body of said valve, said elastomer ring element further urging said diaphragm towards its lower position and allowing closure of said valve without use of a metallic compression spring, wherein said urging of said diaphragm towards its lower position by said elastomer ring is enabled also when the hydraulic pressure above and below said diaphragm are equal, and wherein said elastomer ring element and said diaphragm are separate components.

6. The elastomer diaphragm as claimed in claim 1, wherein said elastomer ring element is produced as part of an integral diaphragm molding.

7. A hydraulically-operated valve fitted with a diaphragm as claimed in claim 1.

* * * * *